United States Patent [19]

van der Lely et al.

[11] 4,006,781
[45] Feb. 8, 1977

[54] ROTARY SOIL-ENGAGING MEMBERS

[76] Inventors: Ary van der Lely, 10, Weverskade, Maasland; Cornelis Johannes Gerardus Bom, 36, Esdoornlaan, Rozenburg, both of Netherlands

[22] Filed: July 17, 1973

[21] Appl. No.: 380,114

[30] Foreign Application Priority Data

July 18, 1972 Netherlands .............. 7209885

[52] U.S. Cl. .................. 172/532; 172/59; 172/68
[51] Int. Cl.² ......................... A01B 21/00
[58] Field of Search ........... 172/59, 68, 149, 151, 172/177, 518, 532, 540, 545, 552, 556, 553; 180/20; 404/122, 124, 129; 29/123

[56] References Cited

UNITED STATES PATENTS

| 557,006 | 3/1896 | Miller | 172/552 X |
| 3,616,862 | 11/1971 | van der Lely | 172/68 X |
| 3,774,688 | 11/1973 | van der Lely et al. | 172/526 X |

FOREIGN PATENTS OR APPLICATIONS

| 233,885 | 6/1964 | Austria | 172/552 |
| 108,221 | 10/1967 | Denmark | 172/184 |
| 1,187,840 | 2/1965 | Germany | 172/552 |
| 6,908,785 | 12/1970 | Netherlands | |

*Primary Examiner*—Edgar S. Burr
*Assistant Examiner*—Paul T. Sewell
*Attorney, Agent, or Firm*—Mason, Mason & Albright

[57] ABSTRACT

A soil engaging roller has a central axis shaft and spaced apart plate-like supports secured to the shaft. The supports are upwardly extending with holes around their perimeters to receive elongated rod-type elements that form the periphery of the roller. The elements can have retaining devices in the form of transverse holes with pins that secure the elements in the holes of the supports. The rods are shiftable or reversible with respect to the supports so that as the contacting surfaces become worn the elements can be altered to occupy different longitudinal positions. The support holes can be punched out with bearing surfaces formed by the bent over rim. Also, the supports can be angled with respect to the shaft and the elements can have several transverse retaining holes to permit shifting and retaining of the elements to the supports.

13 Claims, 7 Drawing Figures

ROTARY SOIL-ENGAGING MEMBERS

This invention relates to rotary soil-engaging members, for example, soil-compressing ground rollers, such members being of the kind comprising at least one roller assembly provided at its soil-engaging periphery with a plurality of movable elongated elements each of which extends substantially parallel to, or in the same general direction as, the axis of rotation of the roller assembly, the elements being carried by spaced supports of the roller assembly.

According to one aspect of the invention, there is provided a rotary soil-engaging member of the kind set forth, wherein means is provided for disposing the elongated elements in any chosen one of at least two different longitudinal positions with respect to the supports.

Figure 1:
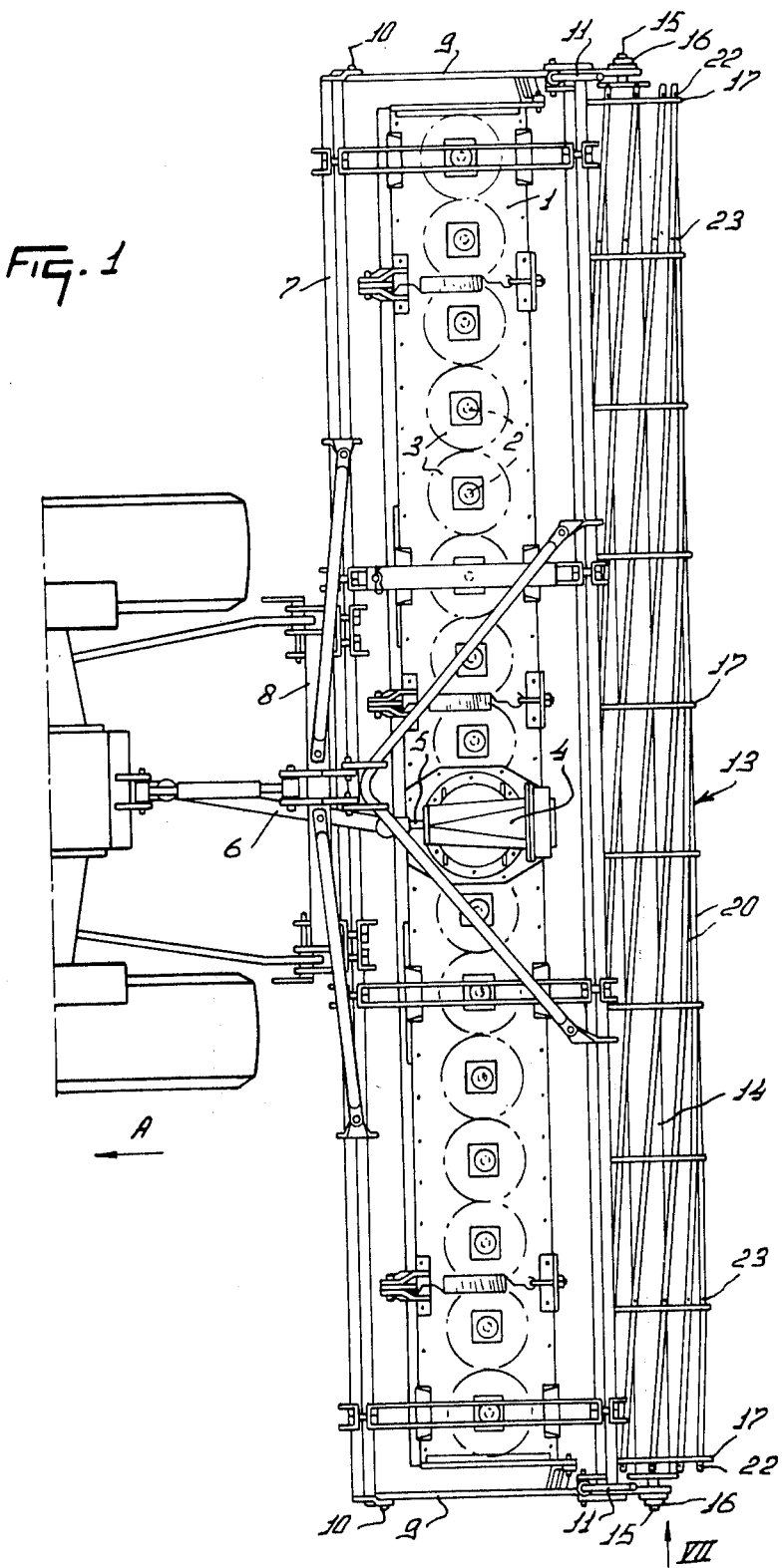
Figure 2:
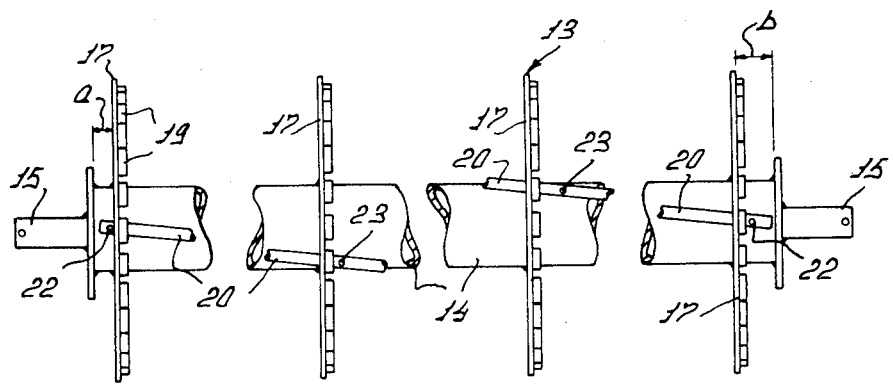
Figure 3:
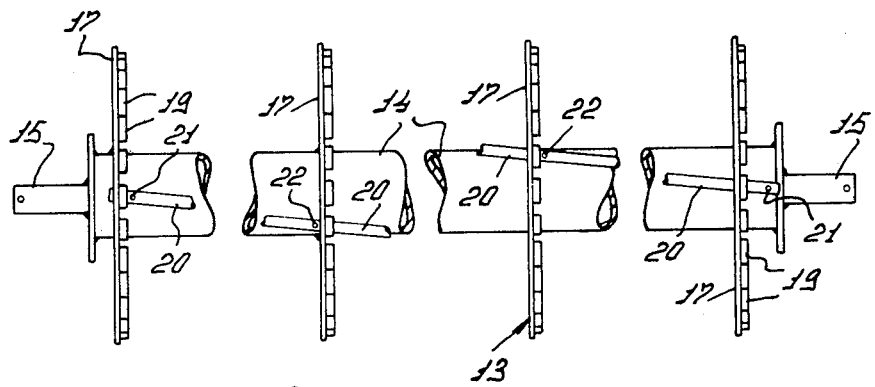
Figure 4:
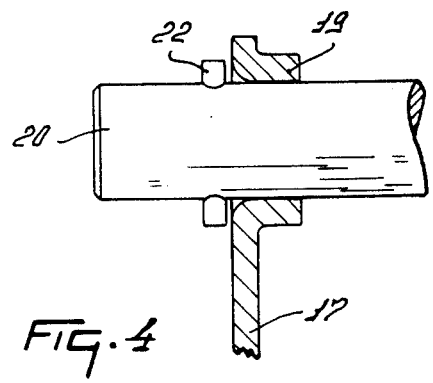
Figure 5:
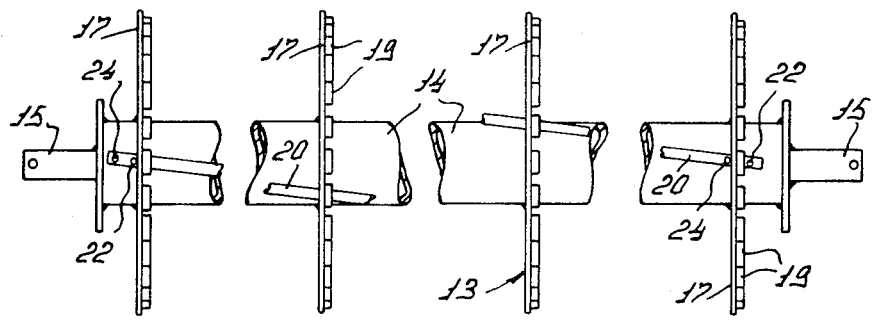
Figure 6:
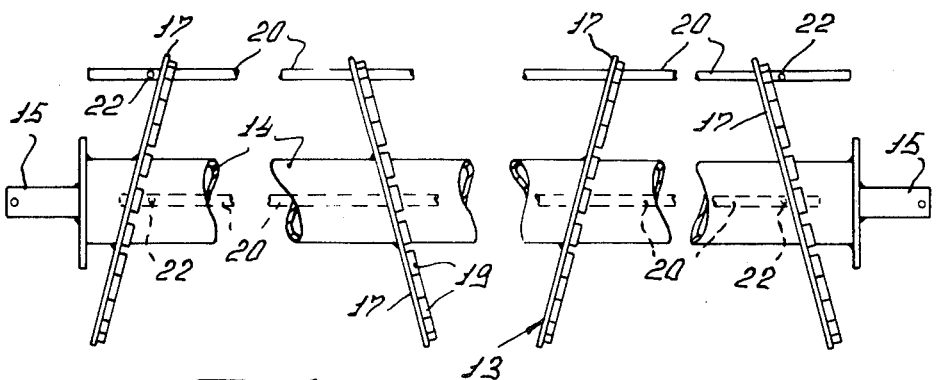
Figure 7:
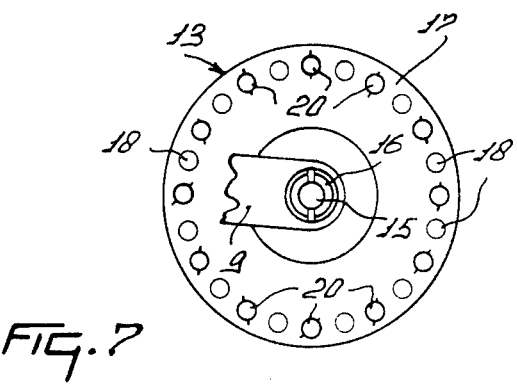

For a better understanding of the invention, and to show how the same may be carried into effect, reference will now be made, by way of example, to the accompanying drawings, in which:

FIG. 1 is a plan view of a rotary harrow coupled to the rear of an agricultural tractor, the harrow including a rotary soil-engaging member in accordance with the invention, FIG. 2 is a scrap elevation, to an enlarged scale, showing the manner of connection of elongated peripheral elements of the soil-engaging member to the remainder of that member in greater detail, FIG. 3 corresponds to FIG. 2 but shows the elongated elements arranged in alternative positions to those shown in FIG. 2, FIG. 4 is a scrap elevation, to an enlarged scale, showing the mounting of one end of one elongated element in greater detail, FIG. 5 substantially corresponds to FIGS. 2 and 3 but illustrates an alternative construction, FIG. 6 substantially corresponds to FIGS. 2, 3 and 5 but shows a further alternative construction, and FIG. 7 is an elevation, to an enlarged scale, as seen in the direction indicated by an arrow VII in FIG. 1.

Referring to FIGS. 1 to 4 and FIG. 7 of the drawings, the rotary harrow that is illustrated in FIG. 1 has a hollow frame portion 1 that extends substantially horizontally perpendicular to the intended direction of operative travel of the harrow that is indicated by an arrow A. A plurality, such as 16, of rotary tined soil working members that are not visible in the drawings are arranged in a single row beneath the frame portion 1 at the lower ends of substantially vertical, or at least upright, shafts 2, said shafts being rotatably mounted in the frame portion 1. Each shaft 2 is provided, inside the hollow frame portion 1, with a corresponding straight- or spur-toothed pinion 3 and it will be evident from FIG. 1 of the drawings that the teeth of each pinion 3 are in mesh with those of its neighbour or both of its neighbours. The shafts 2 are spaced apart from one another at regular intervals that are preferably substantially 25 centimeters and, during the use of the rotary harrow, the tined soil working members at the lower ends of the shafts 2 cultivate overlapping strips of soil since they have working widths that are slightly larger than the distance of substantially 25 centimeters that has just been mentioned. One of the shafts 2 that is located substantially at the center of the row of those shafts has an upward extension into a gear box 4 that is mounted on top of the frame portion 1 and bevel pinions or other transmission members that are contained within the gear box 4 place the extension shaft that has just been mentioned in driven connection with a forwardly projecting rotary input shaft 5 of the gear box. The leading splined or otherwise keyed end of the input shaft 5 can be placed in driven connection with the power take-off shaft of an operating tractor or other vehicle in the manner that is shown in outline in FIG. 1 of the drawings by employing an intermediate telescopic transmission shaft 6 of a construction that is known per se having universal joints at its opposite ends. The frame portion 1 is connected to a substantially rigid supporting frame or other supporting structure 7 and that frame or structure 7 is provided at the front with respect to the direction A with a coupling member 8 that is of generally triangular configuration when seen in elevation. The coupling member 8 is constructed for co-operation with the three-point lifting device or hitch of the same tractor or other vehicle whose power take-off shaft is drivingly connected to the rotary input shaft 5 and it will be seen from FIG. 1 of the drawings that an upper region of the coupling member 8 is rigidly connected by rods or bars to anchorages on front and rear beams of the supporting frame or other supporting structure 7.

The coupling member 8 is located centrally across the width of the supporting frame or other supporting structure 7 and the opposite lateral sides or ends of that frame or structure have arms 9 turnably connected to a leading beam thereof, with respect to the direction A, by aligned pivots 10 that define a substantially horizontal axis extending substantially perpendicular to the direction A. Screw-threaded spindles 11 that are not necessary to describe or illustrate in detail interconnect the arms 9 and the supporting frame or other supporting structure towards the rear of the latter with respect to the direction A and can be employed to turn the arms 9 upwardly or downwardly about the axis defined by the pivots 10 and to retain those arms in any chosen angular settings about said axis. A rotary soil-engaging member in the form of a roller assembly or roller 13 is arranged at the rear of the harrow with respect to the direction A between the rearmost ends of the upwardly and downwardly adjustable arms 9. The roller 13 bears upon the ground surface during the use of the harrow and sustains the supporting frame or other supporting structure 7 at a level above the ground surface which is dictated principally by the angular settings of the arms 9 about the aligned pivots 10. Since the frame portion 1 that carries the rotary soil working members is, in turn, connected to the supporting frame or other supporting structure 7, it will be apparent that the setting of the level of the axis of rotation of the roller 13 relative to the level of the remainder of the harrow is the primary factor that determines the depth of penetration of the tines (not shown) of those soil working members into the ground. The roller 13 extends throughout the width of the strip of soil that is cultivated by the soil working members and, since it is located immediately behind those members with respect to the direction A, it exerts a flattening and/or compressing effect upon the freshly worked soil and will tend to break up any insufficiently crumbled lumps of soil thrown up by the tines of the soil working members located immediately in advance thereof. The roller 13 is rotatable about an axis that is substantially horizontally perpendicular to the direction A and has a central tubular portion axle 14 of right-circular cylindrical configuration. The opposite ends of the tubular portion 14 are provided with projecting horizontally aligned stub shafts 15 and these stub shafts are received in corresponding horizontal bearings 16 mounted at the rear ends of the arms 9. A plurality, and in the illustrated example, ten, of circular plate-shaped supports 17 are spaced apart from one another at regular intervals along the axial length of the roller 13 between the opposite ends of its central portion 14. The general plane of each circular plate-shaped support 17 is perpendicular to the longitudinal axis of the central portion 14 and the two supports 17 that are located closest to the opposite ends of the portion 14 are spaced apart therefrom by different distances $a$ and $b$ (FIG. 2). The distance $a$ preferably, but not essentially, has a magnitude equal to substantially half that of the distance $b$. As previously mentioned, the supports 17 that are located between the end supports of the row are spaced apart from one another by regular distances. Each support 17 is formed around its outer periphery with a plurality of circular holes 18 that are angularly spaced apart from one another at regular intervals. There may be 24 of the holes 18 (see FIG. 7) and each of them is of circular configuaration and is formed by punching the material of the corresponding support 17 in such a way that the punched material forms substantially cylindrical bearing or supporting surfaces 19 of greater width than the supports 17. Elongated elements 20 that are preferably, but not essentially, in the form of rods of circular cross-section are entered through the holes 18 and their bearing or supporting surfaces 19 and it will be seen from FIGS. 1, 2 and 3 of the drawings that the holes 18 which are chosen to co-operate with each element 20 are such that the elements are wound helically around the longitudinal axis of the central portion 14 of the roller between their opposite ends. Each element 20 thus extends generally lengthwise of the roller 13 between substantially the opposite ends of the latter, the extent of the helical twist of each element 20 being such that the opposite ends thereof are preferably angularly displaced from one another by substantially 90° around the longitudinal axis of the central portion 14.

In the example which is being described, each support 17 has 24 holes and it can be seen from FIG. 7 of the drawings that twelve of the elongated elements 20 are used, those elements being entered through alternate holes 18 around the periphery of each support 17. The elongated elements 20 are turnable in the bearing or supporting surfaces 19 of the holes 18 but are prevented from becoming displaced axially to any appreciable extent relative to the supports 17 by retaining means that, in the example which is being described, take the form of transverse pins 22 entered through holes 21 (FIG. 3) formed near the ends of the rods that afford the elements 20. In the positions of the elements 20 that are shown in FIG. 2 of the drawings, the pins 22 are located alongside the relatively remote or outermost sides of the supports 17 that are located close to the opposite ends of the central portion 14 of the roller 13. However, further transverse holes 23 (FIG. 2) are formed through the elements 20 at appreciable distances from the ends thereof and, after withdrawing the pins 22 from the holes 21, withdrawing the elements 20 lengthwise through the holes 18, reversing the elements by turning them through 180° about their midpoints and re-entering them through the holes 18, the pins 22 can be entered through the holes 23 as shown in FIG. 3 of the drawings to retain the elements 20 in alternative positions relative to the supports 17. It will be seen that, when the holes 23 are in use, the pins 22 are located close to the relatively remote sides of the two supports 17 which are next to the supports 17 that are located close to the opposite ends of the central portion 14.

In the use of the rotary harrow, which could also be considered as being a soil cultivating implement or cultivator, that is shown in FIG. 1 of the drawings, the harrow is moved over the ground by a tractor or other operating vehicle in the direction A, its soil working members being rotated from the power take-off shaft of that tractor or other vehicle in such a way that each soil working member revolves in an opposite direction to its neighbour or to both of its neighbours. The rotary harrow that is illustrated by way of example has a working width of substantially 4 meters and, as previously explained, is sustained from the ground by the roller 13 at its rear. The depth of penetration of the tines of the soil working members into the ground is dictated, in accordance with the operating conditions, by adjusting the level of the axis of rotation of the roller 13 relative to the level of the supporting frame or other supporting structure 7 by means of the screw-threaded spindles 11. As the roller 13 passes over the freshly cultivated soil, it flattens and compresses that soil to assist in producing a good seed bed and will crush any surface lumps of soil that are not sufficiently broken up by the tines of the soil working members.

The elongated elements 20 are turnable in the holes 18 in the supports 17 and, since they can be removed lengthwise along the roller 13 from those supports after first withdrawing the pins 22, and subsequently be re-inserted in the holes 18 after having been turned end-for-end through 180°, the regions of the elements 20 that are actually supported by the bearing surfaces 19 can be changed as will be apparent from a comparison of FIGS. 2 and 3 of the drawings, the pins 22 co-operating with the holes 21 in the setting of FIG. 2 but with the holes 23 in the setting of FIG. 3. The supported regions of the elements 20 are thus displaced lengthwise along those elements to a sufficient extent to bring the previously supported regions clear of co-operation with the surfaces 19. It has been found that, with known rollers or other rotary soil-engaging members of the kind in which the longitudinal elements at the periphery thereof are not displaceable to different operative positions, wear can take place somewhat rapidly in the regions of such elements that actually co-operate turnably with the various supports. Wear of this kind can be particularly pronounced under some operating conditions such as may occur in sandy and other abrasive soils. Rollers and other rotary soil-engaging members of this general kind otherwise operate most satisfactorily under the majority of working conditions and the described disadvantage that is sometimes met with when working, for example, very sandy soils, can be minimised, in accordance with the invention, by enabling each element 20 to occupy any one of at least two different operative settings lengthwise of the roller 13 thus at least doubling the effective life of each element 20 by making it unnecessary to scrap that element after an initial period of use has caused the regions thereof that co-operate with the surfaces 19 to become grooved or "necked" by abrasive wear. Displacement of the elements 20 in the manner that has been described enables new unworn regions of those elements to be substituted for the worn regions thereof that initially cooperated with the surfaces 19.

The transverse pins 22 or other retaining means, the holes 21 and 23 and the end-for-end reversibility of the elements 20 constitutes means for disposing the elongated elements in any chosen one of at least two different longitudinal positions with respect to the supports 17.

FIG. 5 shows an alternative construction which is identical to that already described except that each element 20 is formed near its opposite ends with a number (which is two in the illustrated example) of adjacent holes 24 for co-operation with the transverse retaining pins 22. Both holes 24 of each pair are located close to the corresponding supports 17 that are near the opposite ends of the central portion 14 of the roller and the holes 23 are not provided in this embodiment. With this construction, each element 20 can be displaced lengthwise relative to the supports 17 to bring alternative regions thereof into co-operation with the bearing or supporting surfaces 19 without first removing that element from the supports 17 and turning it through 180°. All that is necessary to enable each element 20 to be moved lengthwise after an initial period of wear has taken place is to remove the corresponding pins 22, displace the element longitudinally to the required extent and subsequently replace the pins 22 in the alternative holes 24. The elements 20 can then be used entirely satisfactorily for a second period which may well be at least as long as the first period. In this embodiment, the means for disposing the elongated elements in any chosen one of at least two different longitudinal positions with respect to the supports 17 are constituted by the pins 22 and the alternative holes 24.

FIG. 6 of the drawings illustrates an alternative construction in which the plate-shaped supports 17 are fastened to the central portion 14 of the roller 13 in such a way that the general plane of each support 17 is non-perpendicularly inclined to the longitudinal axis of said central portion. In the particular example illustrated in FIG. 6 of the drawings, each support 17 is inclined to the longitudinal axis of the central portion 14 by an angle of substantially 75° and it will be noted that alternate supports 17 along the row thereof are inclined in alternately opposite directions with respect to one another so that their general planes will intersect. Although it is preferred that the angle between the general plane of each support 17 and the longitudinal axis of the central portion 14 should be the same, this is not absolutely essential and it is possible to provide a construction in which the angles of inclination of different supports 17 vary significantly. With this construction, different regions of the elongated elements 20 are brought into co-operation with the surfaces 19 by withdrawing the pins 22, removing the elements 20 lengthwise from the holes 18, displacing the elements angularly around the axis of the central portion 14 through substantially 90° and replacing the elements in alternative holes 18. FIG. 6 of the drawings illustrates one element 20 in full lines in a first position of use and the same element 20 in broken lines in a second position of use in which it has been displaced around the axis of the central portion 14 in the way that has just been described. It will be evident that alternative regions of the element 20 co-operate with the surfaces 19 of the punched holes 18 in the two different positions that are illustrated and it will also be noted that the holes 21 which receive the transverse pins 22 are located close to the relatively remote sides of the two supports 17 at the opposite ends of the row thereof in the first position of use whereas, in the second position of use that is illustrated in broken lines, said holes 21 are located close to the relatively facing sides of the same two supports 17. In the case of the construction illustrated in FIG. 6 of the drawings, the means for disposing the elongated elements 20 in any chosen one of at least two different longitudinal positions with respect to the supports 17 is afforded by the pins 22, the holes 21 and the inclined disposition of the supports 17 relative to the longitudinal axis of the central portion 14 of the roller 13. FIG. 6 of the drawings illustrates the longitudinal elements 20 arranged so as to extend parallel to the longitudinal axis of the central portion 14 rather than wound helically around that axis as shown in FIGS. 1, 2 and 3 of the drawings. However, the elongated elements 20 can be wound helically around the axis of the central portion 14 in the embodiment of FIG. 6 and it is noted that it is possible to arrange the elements 20 parallel to said axis in the embodiments which have previously been described. If the retaining means that is employed in the embodiment of FIG. 6 takes the form of the transverse pins 22 that co-operate with the holes 21, it is most desirable that the elements 20 should be displaced angularly through 90° around the longitudinal axis of the central portion 14 when bringing them from one position of use to an alternative position. However, it is pointed out that alternative retaining means such as clamps may be employed in which case a 90° displacement of each element 20 around the axis of the central portion 14 may not be needed, it only being necessary to displace each element 20 to any other group of holes 18 whose bearing or supporting surfaces 19 will co-operate with regions of that element 20 that are displaced longitudinally therealong from the worn regions thereof. The inclination of 75° that has been mentioned between the general plane of each support 17 and the longitudinal axis of the central portion 14 is given only by way of example and, with alternative retaining means for the longitudinal elements 20, different inclinations may be chosen that are appropriate to the particular retaining means that is employed.

It has previously been mentioned that FIG. 7 of the drawings shows that the circular plate-shaped supports 17 are formed close to their peripheries with twice the number of holes 18 that are required for co-operation with the elements 20. It will be realised that, under some operating conditions, the bearing or supporting surfaces 19 of the holes 18 themselves will become worn to an undesirable extent due to the movements of the elements 20 therein and, if this should happen, the elements 20 may be withdrawn from the worn holes 18 and replaced in the holes 18 that are shown as not in use in FIG. 7 of the drawings. Thus, the working life of the roller 13 can also be effectively substantially doubled. The bearing or supporting surfaces 19 that are formed by punching the circular holes 18 effectively hold the elongated elements 20 and normally have an extended working life before they become so worn as to interfere with the effective operation of the roller 13. The elongated elements 20 have been described as being afforded by solid rods of circular cross-section but, if desired, said elements may be afforded by tubes of circular cross-section. The desired weight of the roller 13 and the particular purpose to which it is to be put will normally decide whether solid or tubular elements 20 are to be preferred.

Although the roller 13 has been described as being a part of, or attachment for, a rotary harrow or rotary soil cultivating implement, it will be realised that a roller or other rotary soil-engaging member in accordance with the invention may be used as part of, or an attachment for, other implements that perform working operations upon soil and/or that are sustained from the ground surface throughout a broad strip of land during their use. Such an implement may, indeed, be solely a ground-rolling implement that does not perform any other function.

Although various features of the different rotary soil-engaging members that have been described and/or illustrated in the accompanying drawings will be set forth in the following claims as inventive features, it is emphasised that the invention is not necessarily limited to those features and that it includes within its scope all of the parts of the rotary harrow and each rotary soil-engaging member that has been described and/or illustrated both individually and in various combinations.

What we claim is:

1. An elongated roller member comprising a substantially central and horizontal axle portion, said axle portion having ends for rotatably supporting said roller member, a plurality of supports mounted along the length of said axle portion at spaced apart intervals, a plurality of spaced apart elongated elements mounted adjacent the outer peripheries of said supports and said supports providing bearing surfaces for said elements, said elements comprising an outer soil engaging peripheral surface for said roller member, retaining means for securing each of said elements in at least two alternate longitudinal settings with alternate supported regions cooperating with the bearing surfaces of said supports, said supports including two outer supports positioned adjacent said ends of the axle portion and one of said outer supports being located a different distance from one of said ends than the second of said outer supports from the opposite of said ends, said retaining means cooperating with said outer supports to retain said elongated elements in each of said alternate longitudinal settings.

2. A roller member as claimed in claim 1, wherein said retaining means includes a locking member that cooperates with at least one intermediate support between said outer supports, said intermediate support being located adjacent one of said outer supports.

3. A roller member as claimed in claim 1, wherein said supports are substantially perpendicular to said axle portion.

4. A roller member as claimed in claim 1, wherein at least two adjacent supports extend substantially parallel to planes which are non-perpendicularly inclined to said axle portion, said planes being non-parallel to one another.

5. A roller member as claimed in claim 4, wherein said two adjacent supports are substantially parallel to planes that are inclined to said axle portion by substantially the same angle.

6. A roller member as claimed in claim 1, wherein said retaining means comprises pins that are entered through transverse holes in said elongated elements.

7. A soil-engaging member as claimed in claim 6, wherein each elongated element has at least one pair of adjacent transverse holes for receiving said pins.

8. A roller member as claimed in claim 1, wherein said elongated elements are mounted in holes in said supports, each of said supports having a number of holes for receiving said elongated elements, the number of said holes exceeding the number of elongated elements mounted on said roller member.

9. A roller member as claimed in claim 1, wherein said elongated elements extend throughout the axial length of said member, said elongated elements being wound helically around said axle portion.

10. An elongated roller member comprising a substantially central and horizontal tubular axle portion, said axle portion having ends for rotatably supporting said roller member, a plurality of upwardly extending supports mounted along the length of said axle portion at spaced apart intervals, said supports being generally circular and having a plurality of holes with bearing surfaces adjacent the outer circumferences of each of said supports, a plurality of elongated elements being turnably received in the holes of said supports and said elements comprising an outer soil engaging peripheral surface for said member, the number of holes in each support being greater than the number of elongated elements, the bearing surfaces of said holes comprising cylindrical bearing surfaces of substantial width for said elongated elements, the width of said bearing surfaces exceeding that of said supports.

11. A roller member as claimed in claim 10, wherein the number of holes in each support is twice the number of elongated elements mounted on said supports and said holes being spaced apart from one another around the circumferences of said supports by equal distances.

12. A roller member as claimed in claim 10, wherein said supports are plates, and said holes are formed in said plates by punching, bent-over punched material of said plates forming bearing surfaces for slideably receiving said elements.

13. A roller member as claimed in claim 10, wherein said elements have retaining means for securing said elements in at least two different alternate longitudinal positions relative to said supports.

* * * * *